Oct. 9, 1923.
J. MICHELSON
1,470,091
MILLING ATTACHMENT FOR PLANERS
Filed Jan. 25, 1922
6 Sheets-Sheet 1
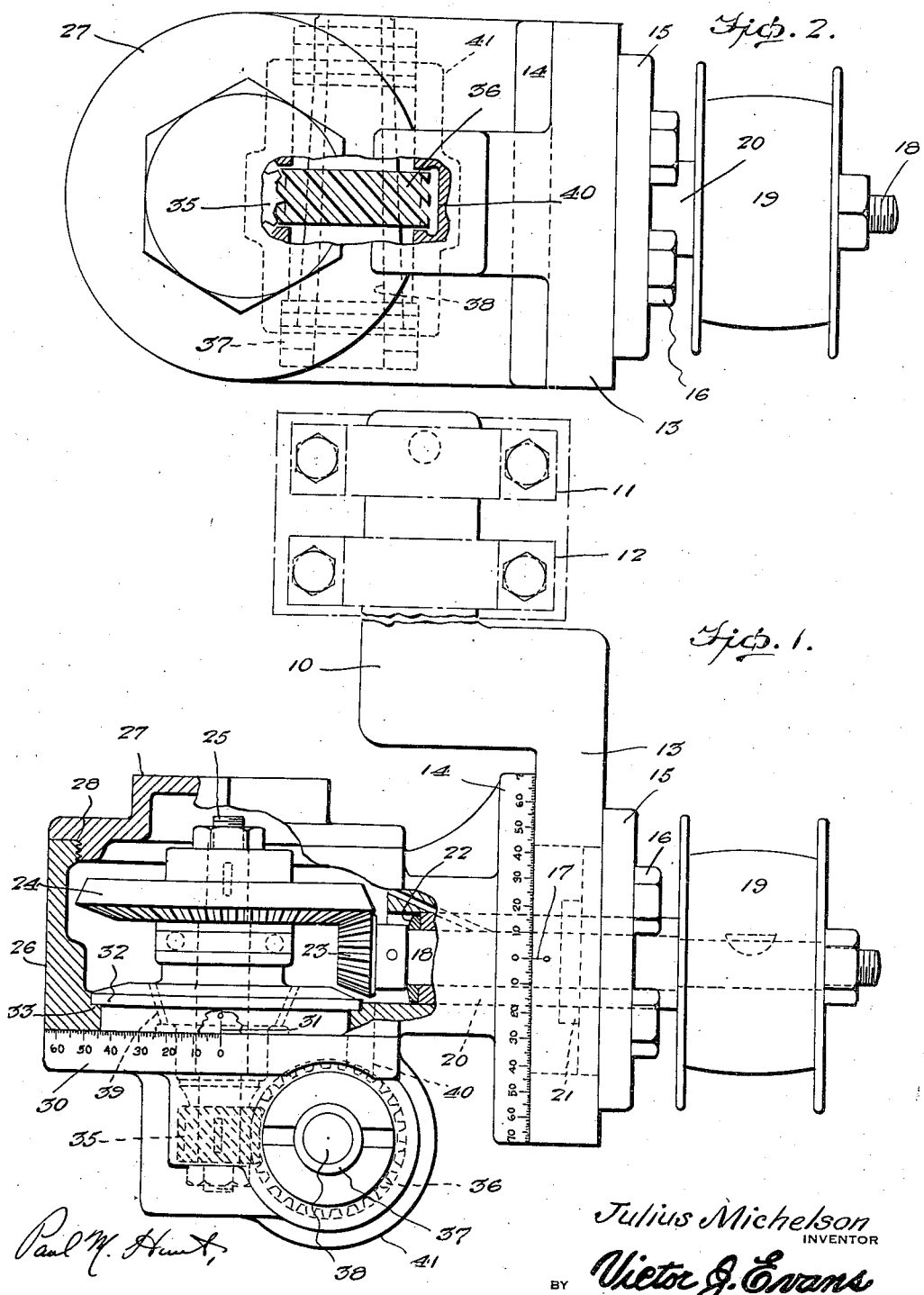
Julius Michelson
INVENTOR
BY Victor J. Evans
ATTORNEY
WITNESS:

Oct. 9, 1923.

J. MICHELSON 1,470,091

MILLING ATTACHMENT FOR PLANERS

Filed Jan. 25, 1922      6 Sheets-Sheet 2

Julius Michelson INVENTOR

BY Victor J. Evans

ATTORNEY

WITNESS:

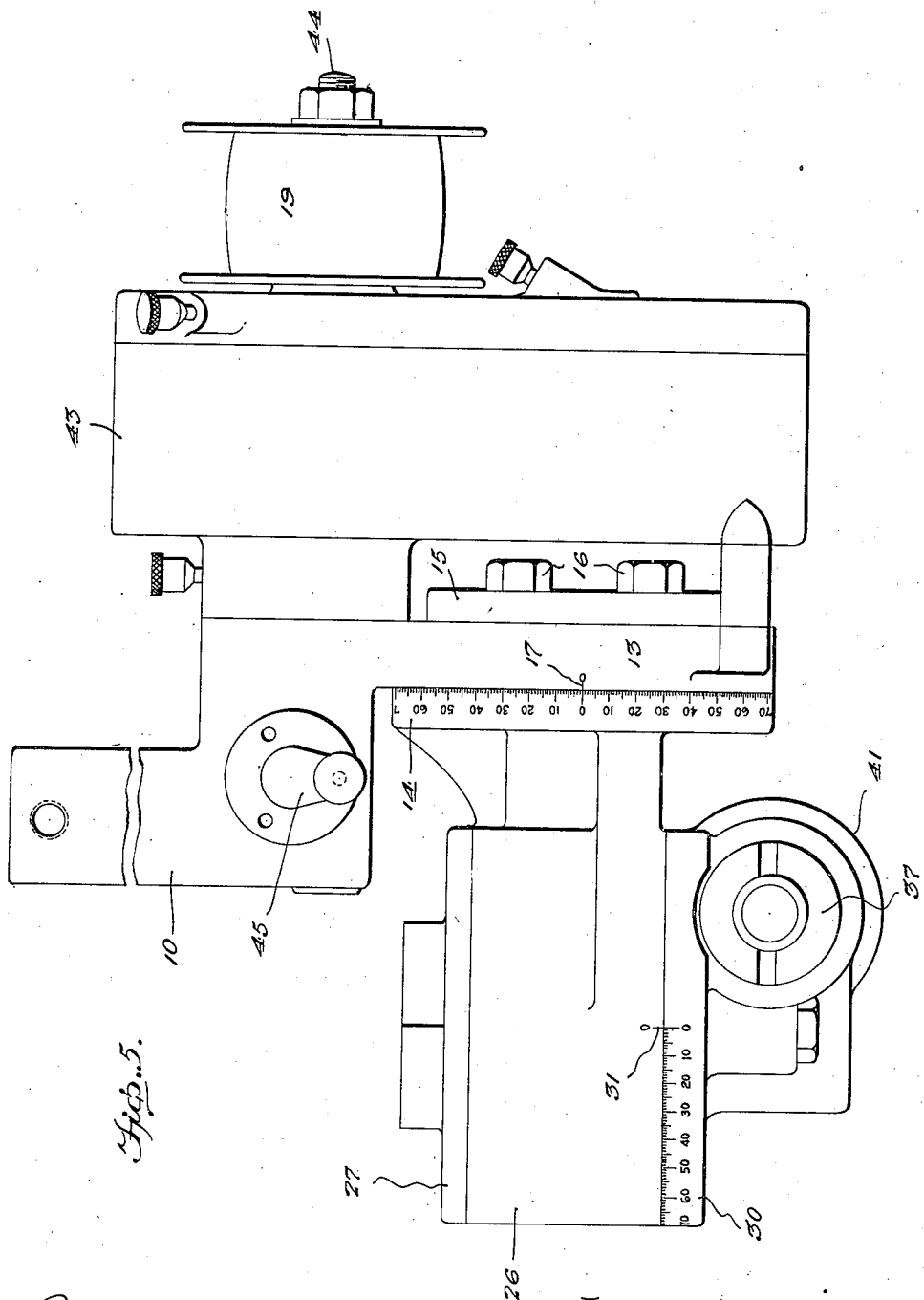

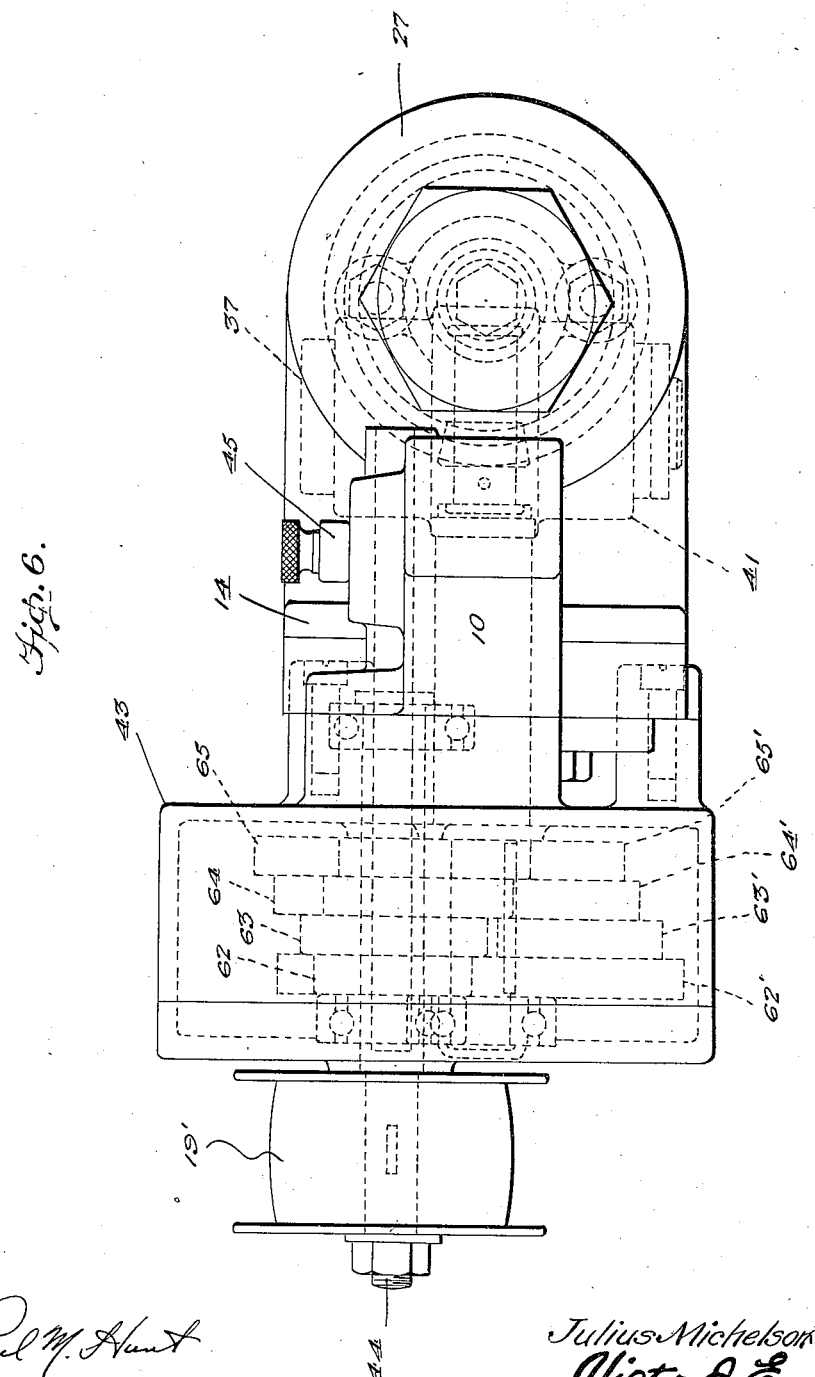

Oct. 9, 1923.
J. MICHELSON
1,470,091
MILLING ATTACHMENT FOR PLANERS
Filed Jan. 25, 1922 6 Sheets-Sheet 5
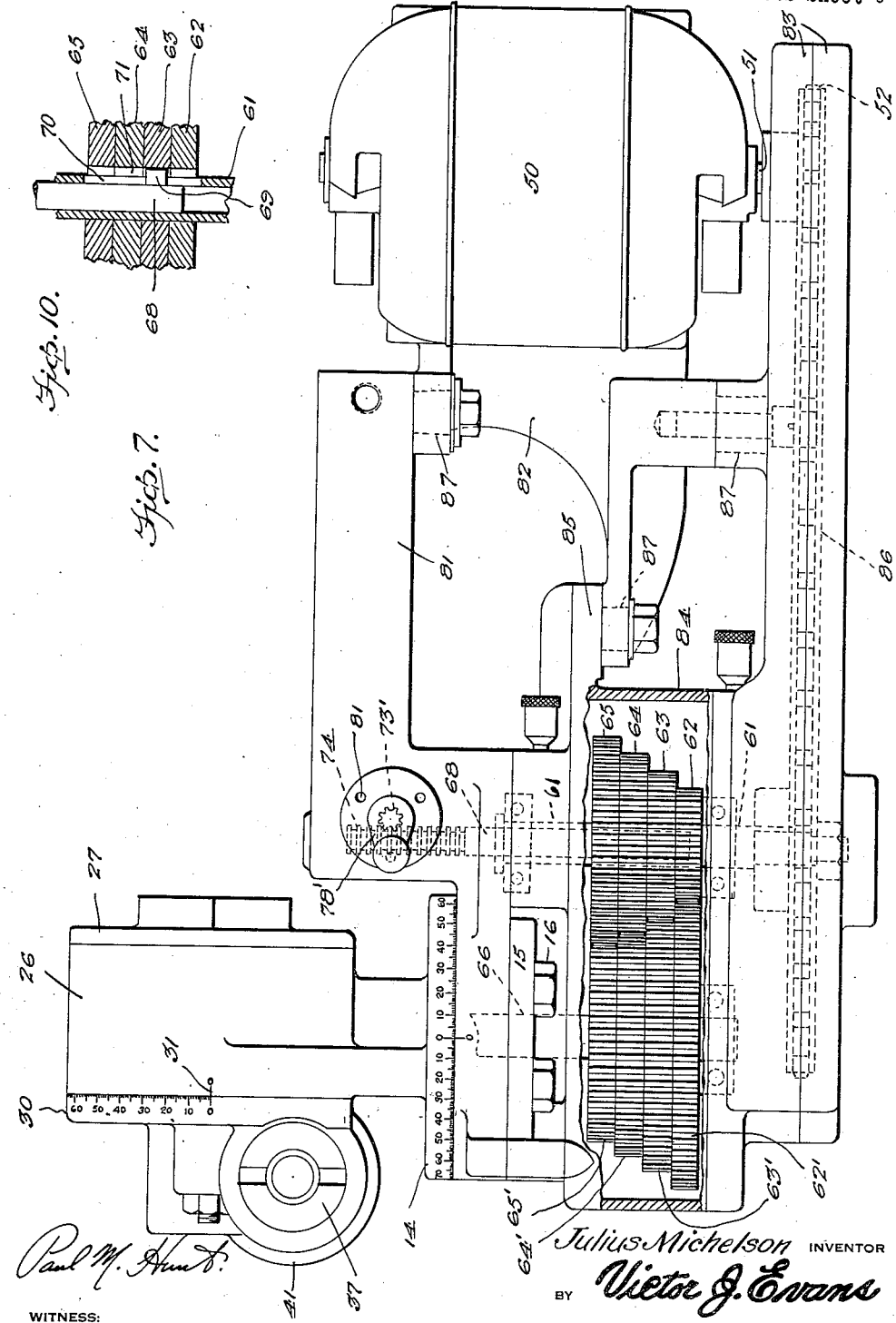
Julius Michelson INVENTOR
BY Victor J. Evans ATTORNEY
WITNESS:

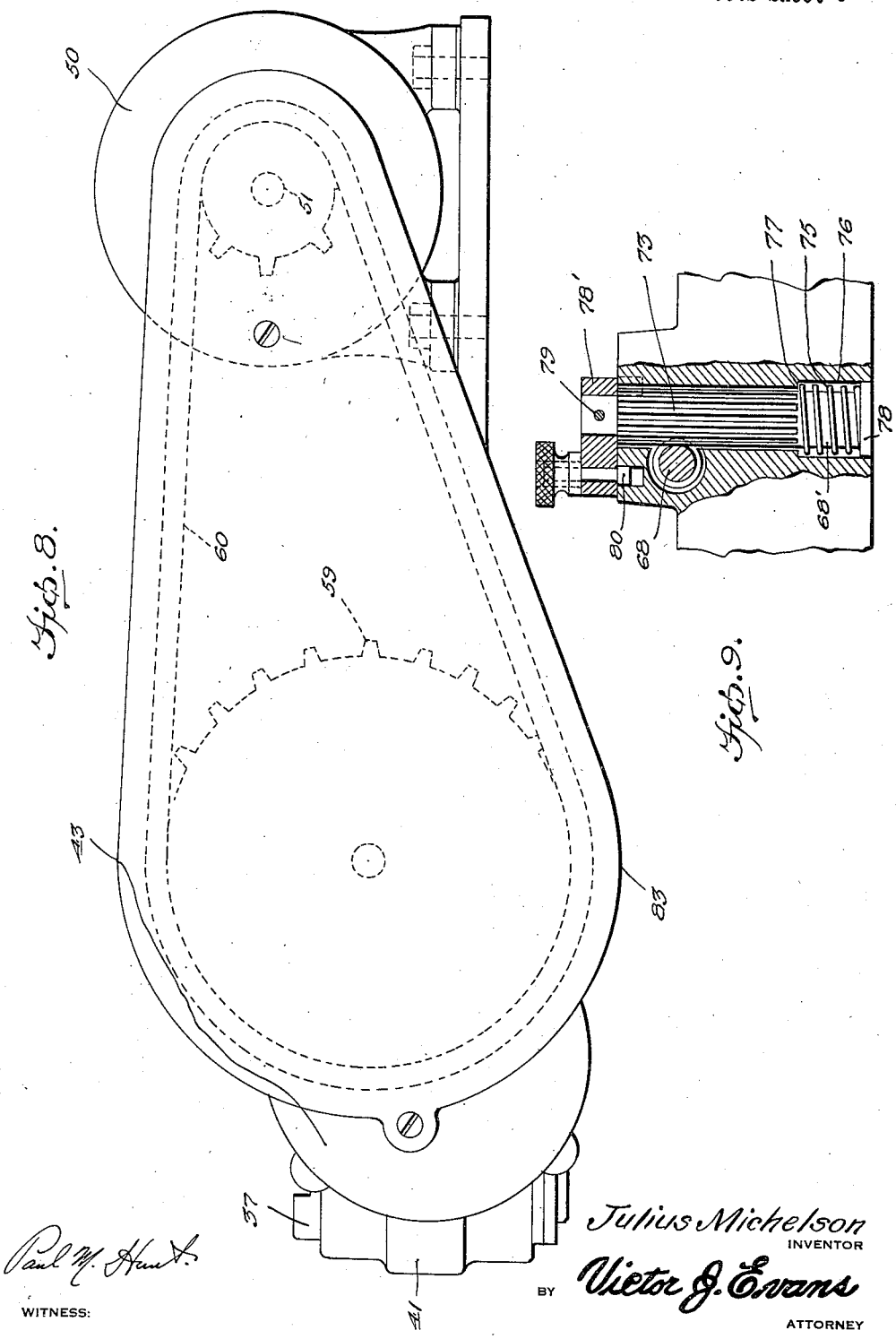

Patented Oct. 9, 1923.

1,470,091

UNITED STATES PATENT OFFICE.

JULIUS MICHELSON, OF BOSTON, MASSACHUSETTS.

MILLING ATTACHMENT FOR PLANERS.

Application filed January 25, 1922. Serial No. 531,782.

*To all whom it may concern:*

Be it known that I, JULIUS MICHELSON, a citizen of the United States, residing at Boston, in the county of Suffolk and State of Massachusetts, have invented new and useful Improvements in Milling Attachments for Planers, of which the following is a specification.

This invention relates to a milling attachment for planers, and the object is to produce a portable universal milling device capable of affording seven different speeds, which may be rotatably attached to a planer, thereby virtually transforming the planer,— which in many shops is idle for a considerable portion of the time because of its limited range of work,—into a large milling machine.

A still further object is to provide a device for attachment to a planer and including a rotating hollow spindle adapted for receiving an arbor and any type of milling cutter used on a regular milling machine.

A further object is to provide a device which will virtually convert a machine of the planer type into a boring mill, capable of boring holes very difficult of approach, substantially universal movement being possible.

A further object is to provide means for performing operations usually possible only on a radial drill press.

A further object is to provide, in one form of the device, a motor driven spindle capable of use in the machine shop in a great variety of operations, and to provide in another form, or forms, a belt driven device.

A still further object is to provide particular change speed mechanism as hereinafter described.

A still further object is to provide particular lubricating means.

With the foregoing and other objects in view, the invention consists in the novel construction and arrangement of elements described and claimed, it being understood that modifications may be made within the scope of the claims, without departing from the spirit of the invention.

Figure 3:
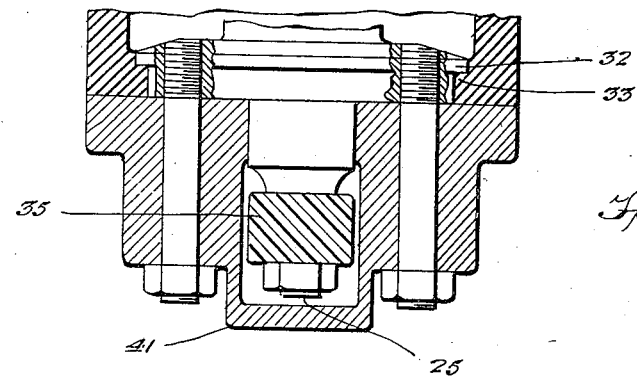
Figure 4:
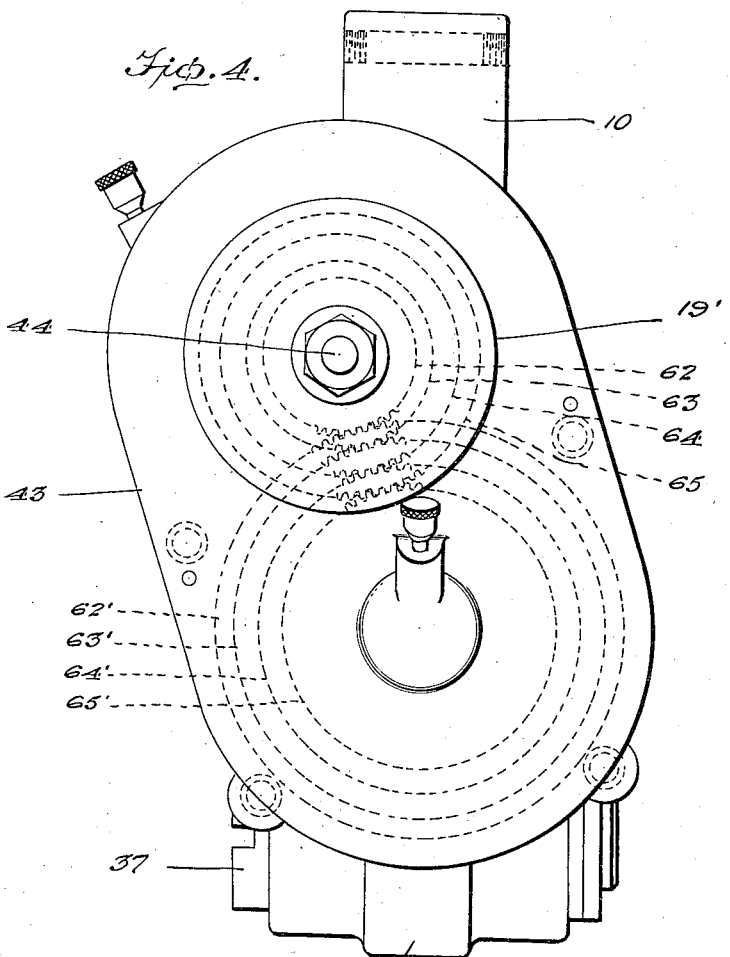

In the drawings, Figure 1 is a view of the attachment in elevation; Figure 2 is a top plan view; Figure 3 is a detail view, in section, showing a portion of the lower housing of Figure 1, and one of the spiral gear wheels for driving the tool; Figures 4 and 5 are views in elevation showing the manner of mounting the attachment with a change speed device; Figure 6 is an elevation, with the change speed device and other elements in dotted lines; Figure 7 is an elevation with parts broken away, showing a change speed mechanism like that used in the form of Figures 4 to 6, but illustrating a motor drive and gear changing devices; Figure 8 is a view looking from the right in Figure 7; Figure 9 is a detail view, in section and elevation, showing means for imparting longitudinal movement to spindle 68 of the change speed mechanism of Figure 7; Figure 10 is a detail view showing a lug or key on spindle 68 for engaging any one of the gear wheels (appearing in section), which it is desired to employ at a given time.

Referring especially to Figure 1, the reference number 10 indicates a bracket or holder adapted to be secured to the tool rest of the planer by means of clamps 11 and 12. This holder 10 includes a portion 13 mounting a rotatable body 14 retained in position by means of plate or ring 15 and tap screws or bolts 16. This body 14 is provided with graduations, as shown, cooperating with an index mark 17 on the portion 13. A shaft 18 carries a belt pulley 19 keyed thereon, the shaft rotating within the bronze bushing 20 including a flange 21 for retaining this element in position. A thrust washer is shown at 22, and a beveled pinion 23 is secured on the end of the shaft 18 and meshes with a bevel gear wheel 24 keyed on the shaft 25. This shaft and gear wheel are mounted in casing 26, the latter being closed by a cover 27, threaded to the casing as shown at 28. Figure 1 shows the casing as being formed with a body 14, and as the latter extends into the bracket 13, and shaft 18 extends through the elements 13 and 14 and mounts a belt pulley on the other side of the bracket, distribution of the strain, incident to the use of the tool to be carried by the spindle, is effected. Pulley 19 being on the side of bracket 13 opposite the tool holding device, the drive on the pulley is an important factor in counteracting strain. Moreover, the flanged body 14, of Figure 1, and the plate 15, are clamped on opposite sides of bracket 13, by means of screws or bolts 16.

Also mounted in the casing 26 is a rotatable or swivelled body 30 provided with graduations cooperating with an index mark 31. This element 30 includes a flanged portion 32 bearing against the shoulder 33 formed on casing 26. It will be observed that the body 30 is rotatable about an axis perpendicular to the axis about which element 14 is rotatable, thereby giving virtually universal movement to the tool to be carried by the device as a whole.

Keyed on the shaft 25 is a spiral gear wheel 35 meshing with spiral gear wheel 36 rigid with and driving the spindle 37 provided with a tapered bore 38. This hollow tapered and slotted spindle is proportioned for receiving the shank of any standard milling cutter, or the like, permitting of the various operations heretofore mentioned. A suitable number of oil holes 39 are provided, and the gears operate constantly in oil inserted into the casing by removing the cover 27. Oil passes through openings 40 to the chamber in the portion 41 in which the spiral gear wheels are mounted, and by providing for lubrication from the inside, the tendency is to wash out fine dirt or foreign material, by the slight leakage of a light grade of oil.

In the form shown in Figure 5, the mounting of the swivelled element is the same as in the form first described, but a change speed device is provided, the eight gear wheels employed in connection therewith being housed in the casing 43. This mechanism is also belt driven, a pulley being shown on shaft 44, the pulley being designated 19'. A controlling device 45 serves to provide for four changes in speed without preliminary change of the position of the gear wheel by opening the gearing casing. This mechanism will be described more in detail in connection with the next form. Figure 6 shows in dotted lines various elements of the form of the device illustrated in Figure 5.

In Figures 7 and 8 I have shown a motor driven device with change speed mechanisms, the motor being designated 50, the armature shaft being shown at 51, and this shaft carrying sprocket wheel 52 illustrated in Figure 8 for driving a sprocket wheel 59 by means of a chain 60.

The sprocket wheel 59 drives a tubular shaft 61 on which the gear wheels 62, 63, 64 and 65 are mounted, the wheels being normally loose on the tubular shaft, and any one of the wheels being adapted to be keyed thereto, to provide for rotation with the shaft. Meshing gear wheels are designated 62', 63', 64' and 65'. These gear wheels last named are keyed on the shaft 66 corresponding with the shaft 18 in the form shown in Figure 1. A spindle 68 extends into hollow shaft 61 and carries a key 69 projecting through longitudinal slot 70 in shaft 61 and adapted to engage the key-way 71 of any one of the gear wheels on the shaft 61, thereby locking that particular gear wheel to the shaft. The spindle 68 is movable longitudinally by means of a pinion 73 engaging the circular rack 74 formed on the spindle by providing a series of annular flanges.

A spring 75 encircles portion 68' of pinion 73 and is located within the bore 76, bears against the shoulders 77 and 78, and serves to permit a given degree of movement of the element 73 under resilient action. This spring 75 tends to hold pinion 73 in the position of Figure 9, but in shifting the gears the operating device referred to below and the pinion are drawn outwardly by hand, and the pinion is rotated for moving spindle 68 longitudinally. The spring restores the elements to normal position after the gears are shifted.

An operating arm 78' is secured by a pin 79 for rotating element 73 and a locking pin 80 enters one of the several openings 81, and retains arm 78' in a given position, and therefore retains the desired set or pair of gears in mesh.

This arrangement provides for four changes of speed, and three additional changes may be effected by removing the cover on the gear case and re-arranging the gears,—thus providing for seven changes in the speed.

In this form of the device, the casting 81 represents the holder, the motor supporting bracket is shown at 82 and the two part casing for the sprocket wheels at 83. The gear casing 84 is clamped to bracket 82 at the point 85. The sprocket chain 86 imparts movement to shaft 61 by means of sprocket wheels similar to those illustrated in Figure 8. Assembly and adjustment of the parts is facilitated by elongated slots 87. In general, the foregoing description is based upon the important features of the device, machine shop details being unnecessary in this connection, and therefore not included.

Having thus described my invention, I claim:

1. In a milling attachment for a planer, a holder for connection with the tool post of the planer, a gear casing including a body extending into and rotatably connected with the holder, gearing within the casing, a shaft for driving the gearing, an element rotatable on said shaft extending through the head and the body, an axis perpendicular to the axis of the shaft, and a tool holding spindle driven from the gearing.

2. In a milling attachment for a planer, a holder for connection with the tool post of the planer, a gear casing rotatably connected with the holder, gearing within the casing, a shaft for driving the gearing, a driving pulley on the shaft and on that side of the holder opposite the gear casing, an element rotatable on an axis perpendicular to the axis of the shaft, and a tool holding spindle mounted on an axis perpendicular to the axis of the shaft and the aforesaid rotatable element.

3. In a milling attachment for a planer, a holder for connection with the tool post of the planer, a gear casing including a body extending into and rotatably connected with the holder, a gearing within the casing, a shaft for driving the gearing, a pulley on the shaft and on that side of the holder opposite the gear casing, a shaft driven by the gearing, a tool holding spindle rotatable on an axis perpendicular to the axis of the shaft first named, and means for driving the spindle from the second named shaft.

4. In a milling attachment for a planer, a holder for connection with the tool post of the planer, a gear casing including a body extending into and rotatably connected with the holder, gearing within the casing, a shaft for driving the gearing, a pulley on the shaft and on that side of the holder opposite the gear casing, a shaft driven by the gearing, a tool holding spindle rotatable on an axis perpendicular to the axis of the shaft first named, and meshing spiral gear wheels for driving the spindle on the second named shaft.

5. In a device of the class described, a rotatably mounted element, a gear casing connected therewith, a driven shaft projecting through said rotatable element and into the casing, a pinion carried by the shaft, a bevelled gear wheel driven by the pinion, a shaft keyed to the gear wheel, an element rotatable with reference to the casing and on an axis perpendicular to the shaft first named, said rotatable element last named including portions engaging one wall of the casing from opposite sides, to form respectively an oil chamber and an angle measuring device, a tool holding spindle perpendicular with reference to each of said shafts, and means for driving the spindle from the second named shaft.

6. In a device of the class described, a rotatably mounted element including a casing, gearing within the casing, a shaft for driving the gearing, a shaft driven by the gearing, an element rotatable with reference to the casing and on an axis perpendicular with reference to the driving shaft, a spindle including a tapered bore and rotatable on an axis perpendicular to the axes of the shafts, means for driving the spindle from the second named shaft, and means for lubricating the spindle from the casing and lubricating the second named shaft through one of the rotatable elements.

7. In a device of the class described, a rotatably mounted element, a gear casing connected therewith, a driven shaft extending into the casing through the rotatable element, a second shaft driven from the shaft first named, an element rotatable with reference to the casing and mounting the second shaft, said element last named including a flanged retaining member cooperating with the wall of the casing and provided with lubricating channels, a spindle mounted to rotate on an axis perpendicular with reference to the axes of said shafts, a casing element connected with the casing first named, the spindle projecting into said casing element, an oil channel being provided between the element last named and the main casing, and gearing for driving the spindle from the second named shaft.

8. In a device of the class described, a hollow spindle and driving means therefor including a shaft, a plurality of gear wheels keyed on the shaft, a tubular shaft, gear wheels loosely mounted thereon and meshing with the gear wheels first named, and means for connecting any of the loosely mounted gear wheels rigidly with the tubular shaft, said means including a slidably mounted spindle operating within the hollow shaft engaging means on the spindle, an elongated pinion contacting with the engaging means, an operating device for shifting the pinion, and a spring normally holding the operating device and pinion against movement.

9. In a device of the class described, a spindle and driving means therefor including a shaft, gear wheels of different diameters keyed on the shaft, a hollow shaft, gear wheels meshing with those first named and loosely mounted on the hollow shaft, driving means for the shaft last named, a spindle slidable within the hollow shaft, a key carried thereby and adapted to lock any of the gear wheels on the hollow shaft, for effecting rotation therewith, a rack carried by the spindle, and a spring held elongated pinion for imparting movement to the rack and spindle.

10. In a device of the class described, a holder for connection with the tool post of a machine tool, means for mounting a rotatable spindle for movement about a plurality of axes, said mounting means being connected with the holder, change speed mechanism for imparting movement to the spindle, a controlling device for said mechanism, a motor mounted on the holder, and means for imparting movement from the shaft of the motor to the change speed mechanism.

In testimony whereof I affix my signature.

JULIUS MICHELSON.